(12) United States Patent
Nasu

(10) Patent No.: US 7,131,127 B2
(45) Date of Patent: Oct. 31, 2006

(54) OPTICAL DISC DRIVE APPARATUS

(75) Inventor: Kazumasa Nasu, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 420 days.

(21) Appl. No.: 10/801,271

(22) Filed: Mar. 16, 2004

(65) Prior Publication Data

US 2004/0184365 A1   Sep. 23, 2004

(30) Foreign Application Priority Data

Mar. 19, 2003   (JP)   ............................. 2003-001428

(51) Int. Cl.
   *G11B 17/04*   (2006.01)
(52) U.S. Cl. ..................................... 720/613
(58) Field of Classification Search ................ 720/613, 720/612, 622, 623, 641
   See application file for complete search history.

(56) References Cited

U.S. PATENT DOCUMENTS

| | | | | |
|---|---|---|---|---|
| 5,995,468 | A | * | 11/1999 | Furukawa .................... 720/607 |
| 6,208,605 | B1 | * | 3/2001 | Akiba ......................... 720/613 |
| 6,910,218 | B1 | * | 6/2005 | Park et al. ................... 720/653 |
| 7,020,884 | B1 | * | 3/2006 | Choi et al. ................... 720/613 |

FOREIGN PATENT DOCUMENTS

| | | |
|---|---|---|
| JP | 7-57362 | 3/1995 |
| JP | 10-340511 | 12/1998 |
| JP | 3088851 | 7/2002 |
| JP | 2002-352501 | 12/2002 |

OTHER PUBLICATIONS

Patent Abstracts of Japan; Publication No. 07-057362 dated Mar. 3, 1995 (2 pgs.).
Japanese Patent Office Registered Utility Model Gazette; Utility Model Registration No. 3088851 dated Jul. 10, 2002 with Partial Translation of Japanese Utility Model Registration No. 3088851 (2 pgs.).
Patent Abstracts of Japan; Publication No. 10-340511 dated Dec. 22, 1998 (2 pgs.).
Patent Abstracts of Japan; Publication No. 2002-352501 dated Dec. 6, 2002 (2 pgs.).
Japanese Search Report dated May 7, 2003 (3 pgs.) with 2-pg. English Translation.

* cited by examiner

*Primary Examiner*—Angel Castro
(74) *Attorney, Agent, or Firm*—Osha Liang LLP

(57) ABSTRACT

An optical disc drive apparatus includes a frame having a sidewall, and a disc tray supported by the frame. The frame has a supporting portion including a guide rib formed protruding from an inner wall surface of the sidewall and a plurality of guide protrusions formed protruding upward from the guide rib. The disc tray has a supported portion implemented by a guide groove slidably engaging to the plurality of guide protrusions. A guide protrusion positioned at the forefront among the plurality of guide protrusions is structured so as to come in surface-contact with a wall surface implementing the guide groove. With such a structure, an optical disc drive apparatus unlikely to be broken even if a force in a transversal direction is applied to the disc tray while the disc tray is at a disc-removable position can be obtained.

3 Claims, 9 Drawing Sheets

OPTICAL DISC DRIVE APPARATUS

BACKGROUND OF THE INVENTION

1. Field of the Invention

The present invention relates to an optical disc drive apparatus to which a disc recording medium represented by a CD (Compact Disc), a DVD (Digital Versatile Disc), or the like is loaded for reproduction or recording of information.

2. Description of the Background Art

In the optical disc drive apparatus, information is recorded and erased by condensing a light beam emitted from an optical pick-up into a small spot on information recording tracks on a rapidly-rotating disc recording medium (hereinafter, simply referred to as an "optical disc") and scanning the tracks. When the information recorded on the optical disc is reproduced, the information recording tracks on the rapidly-rotating optical disc are irradiated with a light beam, and the reflected light is received for reading the information.

Generally, the optical disc is loaded to the optical disc drive apparatus of the above-described type by mounting the optical disc on a disc tray drawn out of a cabinet and storing the disc tray in the cabinet by means of a tray moving mechanism. The optical disc loaded in the cabinet is clamped by a turntable and a damper and floats from the disc tray. A high-speed rotation operation of the optical disc is thus enabled.

A variety of types of structures have been invented as the tray moving mechanism described above. For example, Japanese Patent Laying-Open No. 7-57362 and Japanese Utility Model Registration No. 3088851 disclose a general structure of the tray moving mechanism.

FIG. 10 is a schematic top view showing a tray moving mechanism of a conventional optical disc drive apparatus, the disc tray being at a disc-removable position. As shown in FIG. 10, the optical disc drive apparatus includes a cabinet (not shown), a frame 120 arranged in the cabinet, and a disc tray 110 slidably supported by frame 120.

A disc mount portion 112 on which an optical disc is mounted is formed on an upper surface of disc tray 110. An opening 111 is formed in the center of disc tray 110, through which elevation/lowering of the turntable as well as irradiation of the information recording tracks on the optical disc with the light beam emitted from the optical pick-up are allowed. Elevation of the turntable through opening 111 will push up the optical disc mounted on disc mount portion 112 to a chucking position. In addition, irradiation of the information recording tracks on the optical disc with the light beam through opening 111 will enable recording and reproduction of the information.

A supporting portion for supporting disc tray 110 is provided in a sidewall 120a of frame 120. On the other hand, a supported portion supported by the supporting portion of frame 120 is provided at a side edge of disc tray 110. More specifically, the supporting portion of frame 120 includes a guide rib 126, a plurality of guide protrusions 127a, 127b, . . . formed on guide rib 126, and guide tabs 128. Meanwhile, the supported portion of disc tray 110 includes a guide groove 113 provided on a lower surface of disc tray 110. In other words, the plurality of guide protrusions 127a, 127b, . . . provided on frame 120 engage to guide groove 113 provided in disc tray 110, so that disc tray 110 is slidably supported by frame 120. Guide tabs 128 provided in frame 120 serve to prevent disengagement of guide protrusions 127a, 127b, . . . described above from guide groove 113.

A stopper 129 provided in frame 120 abuts on a stopper 115 provided in disc tray 110, so as to prevent failing of disc tray 110.

Power generated by a driving motor 121 is utilized to move disc tray 110. For transmission of the power, components serving as power transmission mechanisms such as a timing belt 122, a gear 123, pinions 124, 125, a rack 132 provided in a slider 130, a protrusion 133 also provided in slider 130, a rack 114 provided in disc tray 110, a guide rail 116 provided on the lower surface of disc tray 110, and the like are used.

FIG. 11 is a partially enlarged view showing a shape of a guide protrusion positioned at the forefront in the optical disc drive apparatus described above, whereas FIG. 12 is a schematic cross-sectional view along the line XII—XII of the optical disc drive apparatus shown in FIG. 11.

As shown in FIGS. 11 and 12, in the conventional optical disc drive apparatus, a guide protrusion 127a positioned at the forefront among guide protrusions 127a, 127b, . . . provided on guide rib 126 is implemented by a boss having a columnar shape and integrally formed with frame 120. Accordingly, guide protrusion 127a positioned at the forefront has been in line contact with a wall surface 113a implementing guide groove 113 provided in disc tray 110.

In the optical disc drive apparatus with the above-described structure, if a force is applied in a direction F in FIG. 10, that is, in a transversal direction with respect to disc tray 110 while disc tray 110 is drawn out and at the disc-removable position, guide protrusion 127a positioned at the forefront is broken. This is because the load is concentrated on guide protrusion 127a positioned at the forefront when disc tray 110 is drawn out and at the disc-removable position. If guide protrusion 127a positioned at the forefront is broken, disc tray 110 may fall at worst, resulting in failure of the optical disc drive apparatus.

SUMMARY OF THE INVENTION

An object of the present invention is to provide an optical disc drive apparatus which is unlikely to be broken and can avoid falling of the disc tray even if a force in a transversal direction is applied to the disc tray while it is at a disc-removable position.

An optical disc drive apparatus according to a first aspect of the present invention includes a box-shaped cabinet having an opening in a front face, a frame provided in the cabinet and having a sidewall, and a disc tray supported by the frame. The optical disc drive apparatus is structured such that the disc tray can freely slide between a disc-loaded position and a disc-removable position by engagement of a supporting portion provided in the sidewall of the frame to a supported portion provided at a side edge of the disc tray. Here, the disc-loaded position refers to a position of the disc tray at which a disc recording medium is held and allowed to rotate in the cabinet, whereas the disc-removable position refers to a position of the disc tray at which the disc tray partially comes out in a forward direction from the opening so as to allow loading/removing of the disc recording medium. The supporting portion includes a guide rib formed protruding from an inner wall surface of the sidewall toward a center of the disc drive apparatus, and a plurality of guide protrusions formed protruding upward from the guide rib in a front-to-rear direction of the guide rib. The supported portion has a guide groove slidably engaging to the plurality of guide protrusions on a lower surface of the disc tray. A guide protrusion positioned at the forefront among the plurality of guide protrusions is structured so as to come in surface-contact with a wall surface implementing the guide groove. A root portion of the guide protrusion has a width increasing solely toward the center of the disc drive apparatus with respect to its tip end portion.

In this manner, the structure is such that the guide protrusion positioned at the forefront is in surface-contact with the wall surface implementing the guide groove. Accordingly, even if the force in the transversal direction is applied to the disc tray, the force applied to the guide protrusion from the guide groove of the disc tray is distributed, whereby breakage of the guide protrusion will be unlikely. In addition, the guide protrusion positioned at the forefront has a larger width in its root portion, thereby achieving a reinforcement effect of the guide protrusion. Therefore, breakage of the guide protrusion will be further unlikely. Moreover, the root portion of the guide protrusion positioned at the forefront has a width increasing solely on the center side of the disc drive apparatus. In this manner, in an engagement portion of the guide protrusion to the guide groove, a large contact area for engagement of the guide protrusion to the guide groove is ensured in a portion where the guide protrusion does not have an increased width, whereas the reinforcement effect of the guide protrusion is obtained in a portion where the guide protrusion has an increased width. Accordingly, prevention of falling of the disc tray and prevention of breakage of the guide protrusion are both achieved. As described above, an optical disc drive apparatus which is unlikely to be broken and can avoid falling of the disc tray even if a heavy load is applied to the disc tray can be provided.

An optical disc drive apparatus according to a second aspect of the present invention includes a box-shaped cabinet having an opening in a front face, a frame provided in the cabinet and having a sidewall, and a disc tray supported by the frame. The optical disc drive apparatus is structured such that the disc tray can freely slide between a disc-loaded position and a disc-removable position by engagement of a supporting portion provided in the sidewall of the frame to a supported portion provided at a side edge of the disc tray. Here, the disc-loaded position refers to a position of the disc tray at which a disc recording medium is held and allowed to rotate in the cabinet, whereas the disc-removable position refers to a position of the disc tray at which the disc tray partially comes out in a forward direction from the opening so as to allow loading/removing of the disc recording medium. The supporting portion includes a guide rib formed protruding from an inner wall surface of the sidewall toward a center of the disc drive apparatus, and a plurality of guide protrusions formed protruding upward from the guide rib in a front-to-rear direction of the guide rib. The supported portion has a guide groove slidably engaging to the plurality of guide protrusions on a lower surface of the disc tray. A guide protrusion positioned at the forefront among the plurality of guide protrusions is structured so as to come in surface-contact with a wall surface implementing the guide groove.

In this manner, the structure is such that the guide protrusion positioned at the forefront is in surface-contact with the wall surface implementing the guide groove. Accordingly, even if the force in the transversal direction is applied to the disc tray, the force applied to the guide protrusion from the guide groove of the disc tray is distributed, whereby breakage of the guide protrusion will be unlikely.

Preferably in the optical disc drive apparatus according to the second aspect of the present invention, for example, the guide protrusion positioned at the forefront has a width larger in its root portion than in its tip end portion.

In this manner, the guide protrusion positioned at the forefront has a larger width in its root portion, thereby achieving a reinforcement effect of the guide protrusion. Therefore, breakage of the guide protrusion will be further unlikely.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, one embodiment of the present invention will be described with reference to the figures.

Figure 1:
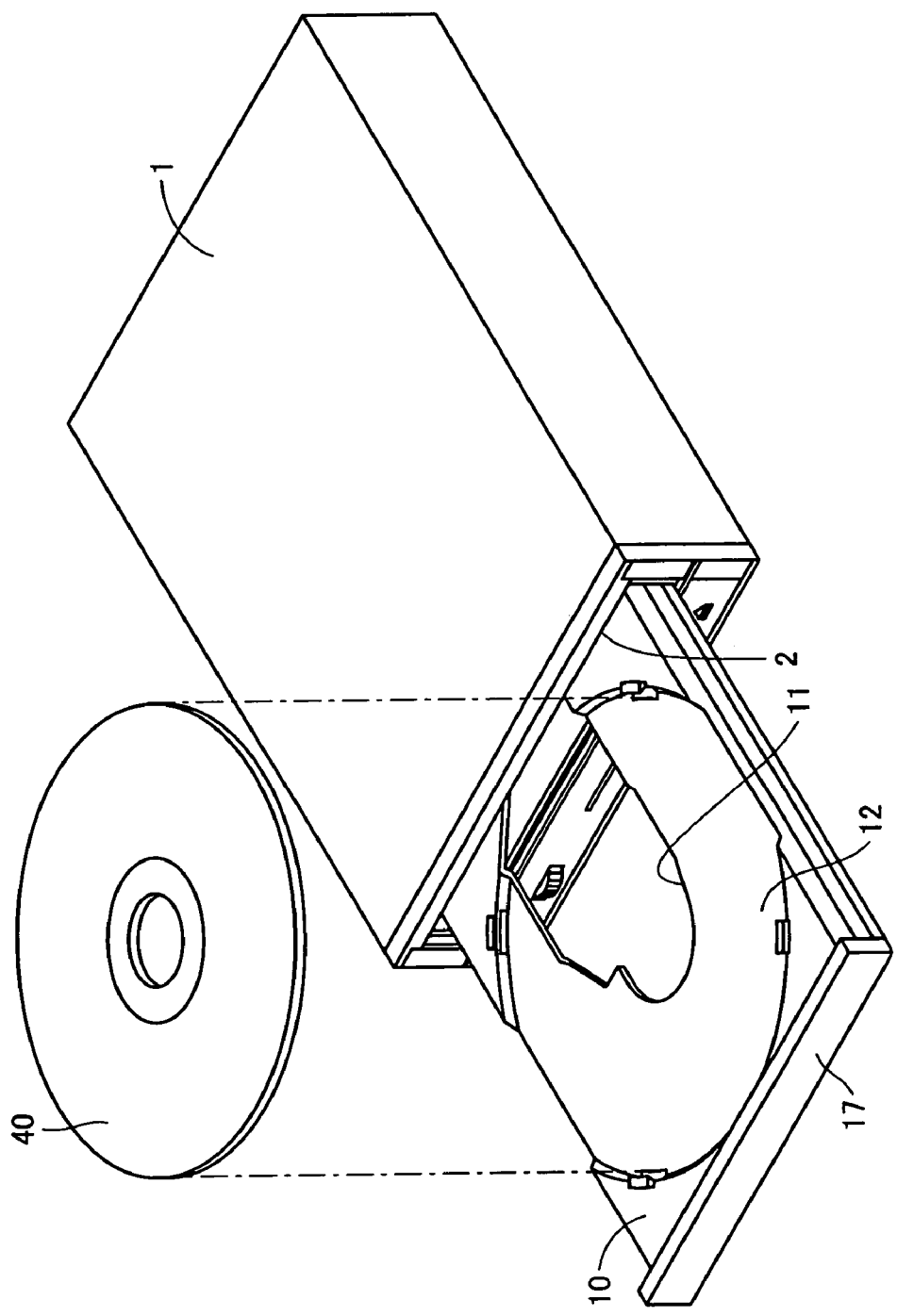
FIG. 1 is a schematic perspective view of an optical disc drive apparatus in an embodiment of the present invention.

Referring to FIG. 1, an overall structure of the optical disc drive apparatus in the present embodiment will now be described. As shown in FIG. 1, the optical disc drive apparatus in the present embodiment mainly includes a box-shaped cabinet 1 having an opening 2 on a front face, a frame 20 (see FIG. 3) arranged in cabinet 1, and a disc tray 10 supported by frame 20.

Loading of an optical disc 40 to the optical disc drive apparatus is performed in the following manner. Optical disc 40 is mounted on a disc mount portion 12 of disc tray 10 drawn out of cabinet 1. Then, disc tray 10 is stored in cabinet 1 using the tray moving mechanism. FIG. 1 shows a state in which disc tray 10 partially comes out in the forward direction from front opening 2 of cabinet 1 and disc tray 10 is positioned at the disc-removable position allowing loading/removing of optical disc 40.

Figure 2:
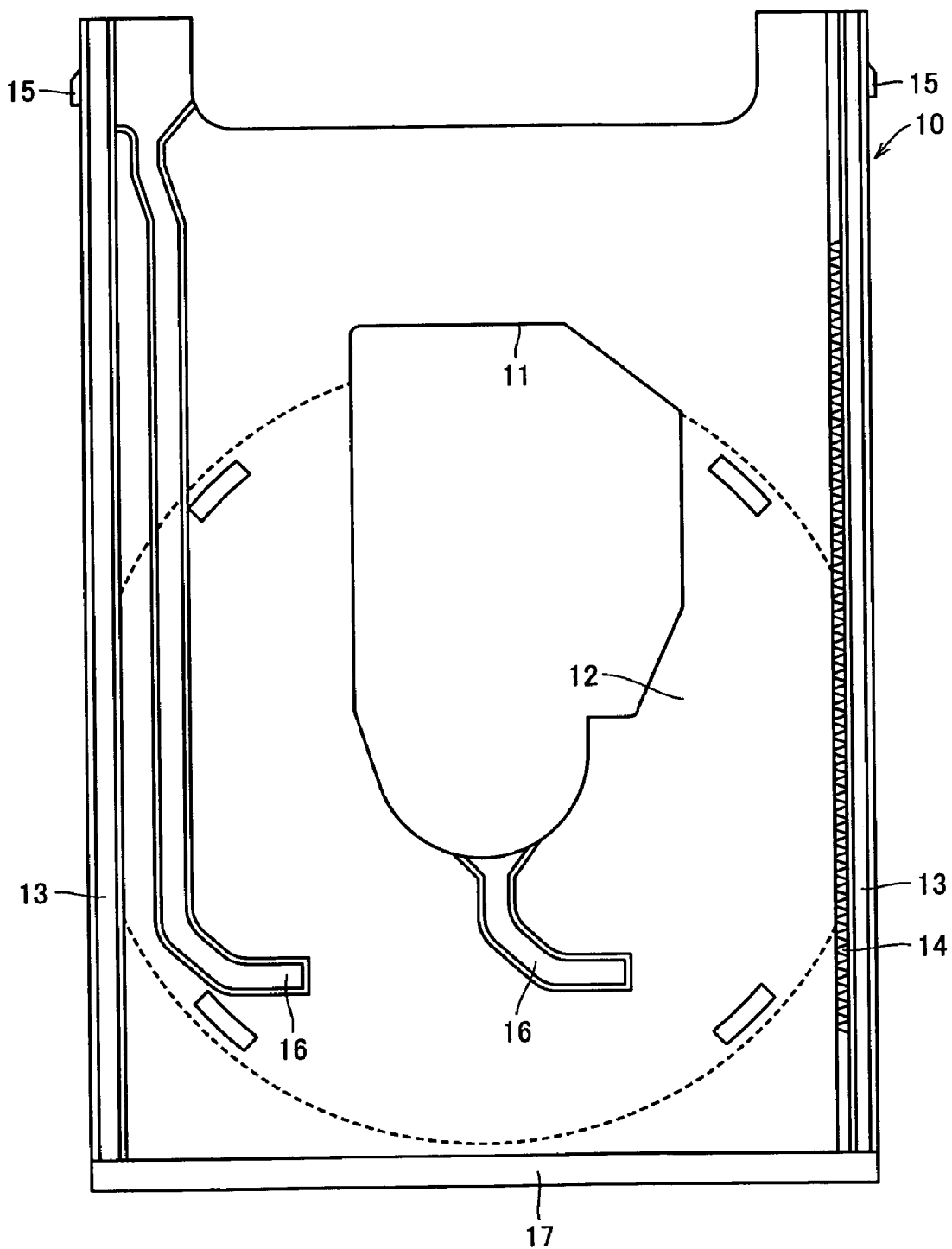
FIG. 2 is a backside view of a disc tray of the optical disc drive apparatus in the embodiment of the present invention.

Referring now to FIG. 2, a structure of the disc tray of the optical disc drive apparatus in the present embodiment will be described in detail. As shown in FIG. 2, disc tray 10 has disc mount portion 12 for carrying an optical disc thereon. Disc mount portion 12 is implemented by forming a concave portion in the upper surface of disc tray 10, and a position of optical disc 40 is determined by a wall surface of the concave portion. A cosmetic plate 17 is attached to a forward end of disc tray 10.

Disc tray 10 has an opening 11 in the center. Opening 11 is provided so as to allow elevation/lowering of the turntable while disc tray 10 is stored in cabinet 1. In addition, opening 11 allows irradiation of the information recording tracks on optical disc 40 with a light beam emitted from the optical pick-up. Elevation of the turntable through opening 11 will push up optical disc 40 mounted on disc mount portion 12 to a chucking position. In addition, irradiation of the information recording tracks on optical disc 40 with the light beam through opening 11 will enable recording and reproduction of the information.

A supported portion supported by the supporting portion of frame 20 described later is provided at a side edge of disc tray 10. The supported portion is formed protruding from disc tray 10 in a side direction. The supported portion includes a guide groove 13 provided on a lower surface and extending in a front-to-rear direction of disc tray 10. A stopper 15 is provided in a rear portion of the side edge of disc tray 10. Stopper 15 abuts on a stopper 29 provided on frame 20 described later, so as to attain a function to prevent falling of disc tray 10 from frame 20.

A guide rail 16 engaging to a protrusion 33 of a slider 30 described later is provided on the lower surface of disc tray 10. Guide rail 16 extends in a front-to-rear direction of disc tray 10, and its front end is curved in a direction substantially orthogonal to the front-to-rear direction of disc tray 10.

A rack 14 is formed in a front-to-rear direction at a prescribed position of the lower surface of disc tray 10. Engaged to a second pinion 25 among a variety of power transmission mechanisms attached to frame 20 described later (see FIG. 3), rack 14 serves to transmit driving power from a driving motor 21 serving as a driving power source to disc tray 10, as well as to move disc tray 10 back and forth.

Here, disc tray 10 having a structure as described above is integrally formed by injection molding, using a resin material such as an ABS resin.

Figure 3:
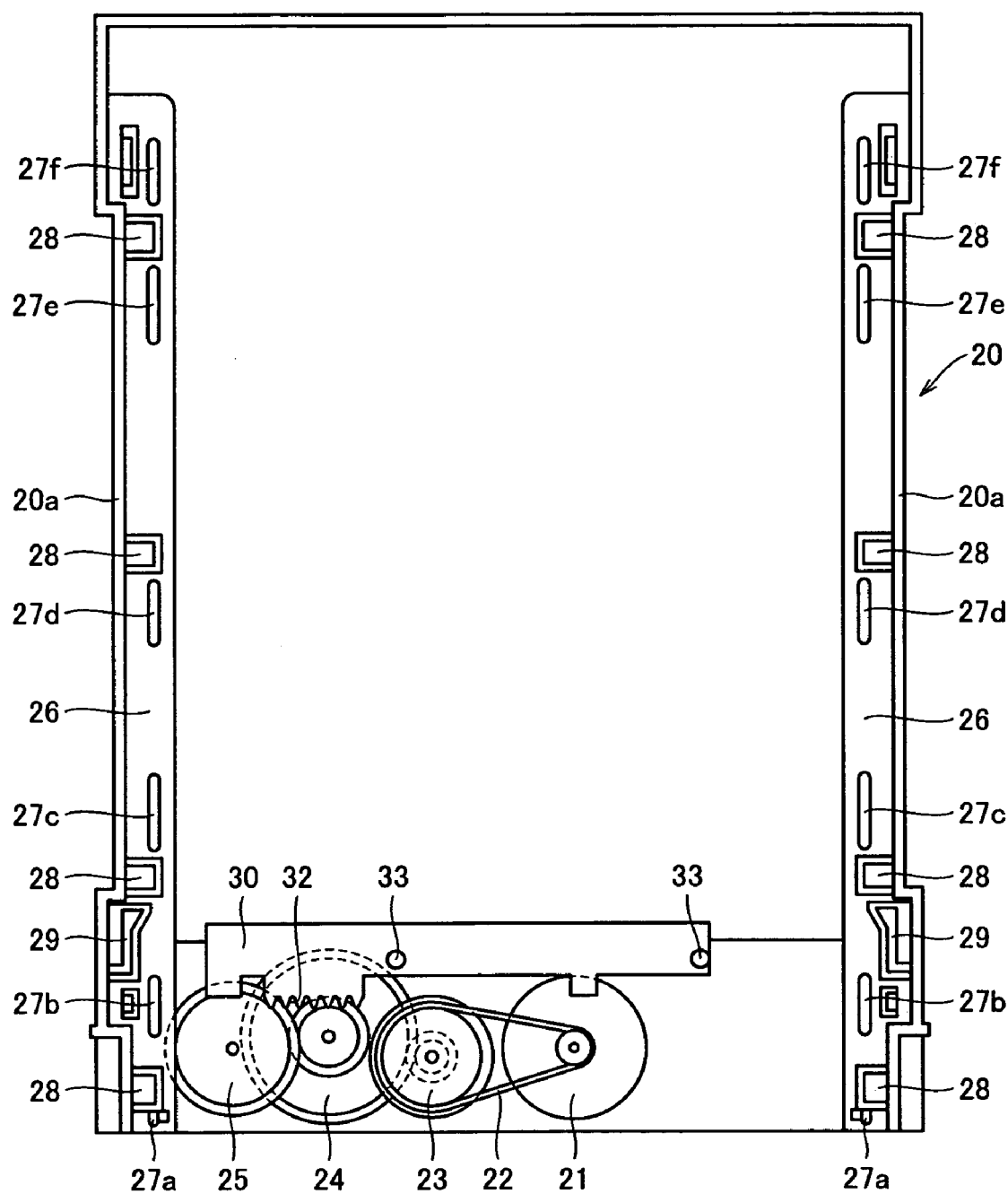
FIG. 3 is a top view of a frame of the optical disc drive apparatus in the embodiment of the present invention.

A structure of the frame of the optical disc drive apparatus in the present embodiment will now be described in detail. As shown in FIG. 3, frame 20 is a frame body integrally formed by injection molding, using a resin material such as an ABS resin, and has a sidewall 20a on its side. In sidewall 20a, the supporting portion which supports the supported position of disc tray 10 is formed.

The supporting portion includes a guide rib 26 formed protruding inward from an inner wall surface of sidewall 20a, and a plurality of guide protrusions 27a to 27f formed protruding upward from guide rib 26 in a front-to-rear direction thereof. Guide rib 26 extends in a front-to-rear direction of frame 20, and a plurality of guide protrusions 27a to 27f are formed in a line in a front-to-rear direction of guide rib 26.

A plurality of guide tabs 28 are further formed on sidewall 20a of frame 20. Guide tabs 28 are formed on the inner wall surface above guide rib 26. In addition, a stopper 29 is provided at the front end of sidewall 20a of frame 20. Stopper 29 abuts on stopper 15 on disc tray 10 described above, so as to prevent falling of disc tray 10 from frame 20.

Driving motor 21 is arranged in a front portion of frame 20. In addition, components serving as power transmission mechanisms such as a timing belt 22, a gear 23, pinions 24, 25, and a slider 30 are arranged adjacent to driving motor 21 in the front portion of frame 20. Here, slider 30 is assembled to frame 20 such that it can move approximately in parallel to the front face of cabinet 1.

Figure 4:
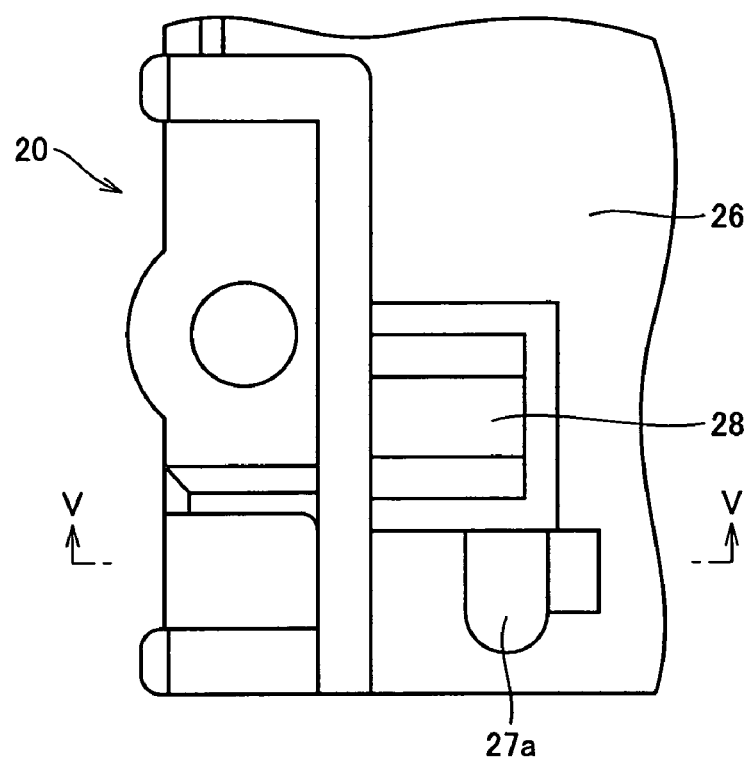
FIG. 4 is a partially enlarged view showing a shape of a guide protrusion of the optical disc drive apparatus in the embodiment of the present invention.
Figure 5:
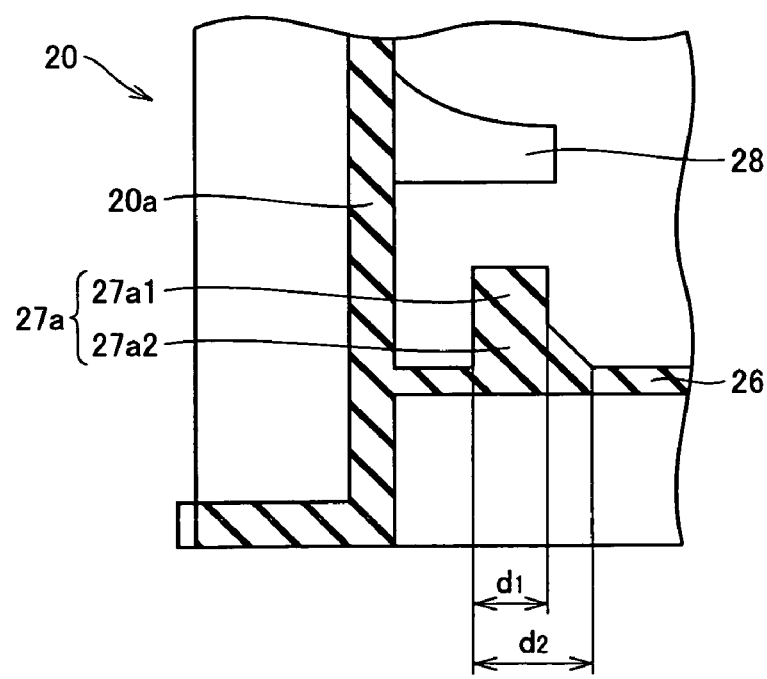
FIG. 5 is a schematic cross-sectional view along the line V—V of the optical disc drive apparatus in the embodiment shown in FIG. 4.

As shown in FIGS. 4 and 5, a guide protrusion 27a positioned at the forefront of guide rib 26 of frame 20 is implemented by a substantially rectangular boss formed protruding upward from guide rib 26. Guide protrusion 27a has a tip end portion 27a1 and a root portion 27a2. Root portion 27a2 has a width increasing toward the center of the frame with respect to tip end portion 27a1. In other words, in FIG. 5, a width d2 of root portion 27a2 of guide protrusion 27a is larger than a width d1 of tip end portion 27a1.

An assembly structure of the optical disc drive apparatus in the present embodiment will now be described. It is to be noted that, for better understanding, the cabinet, the optical pick-up or the like is not illustrated in FIGS. 6 to 9 referenced below.

Figure 6:
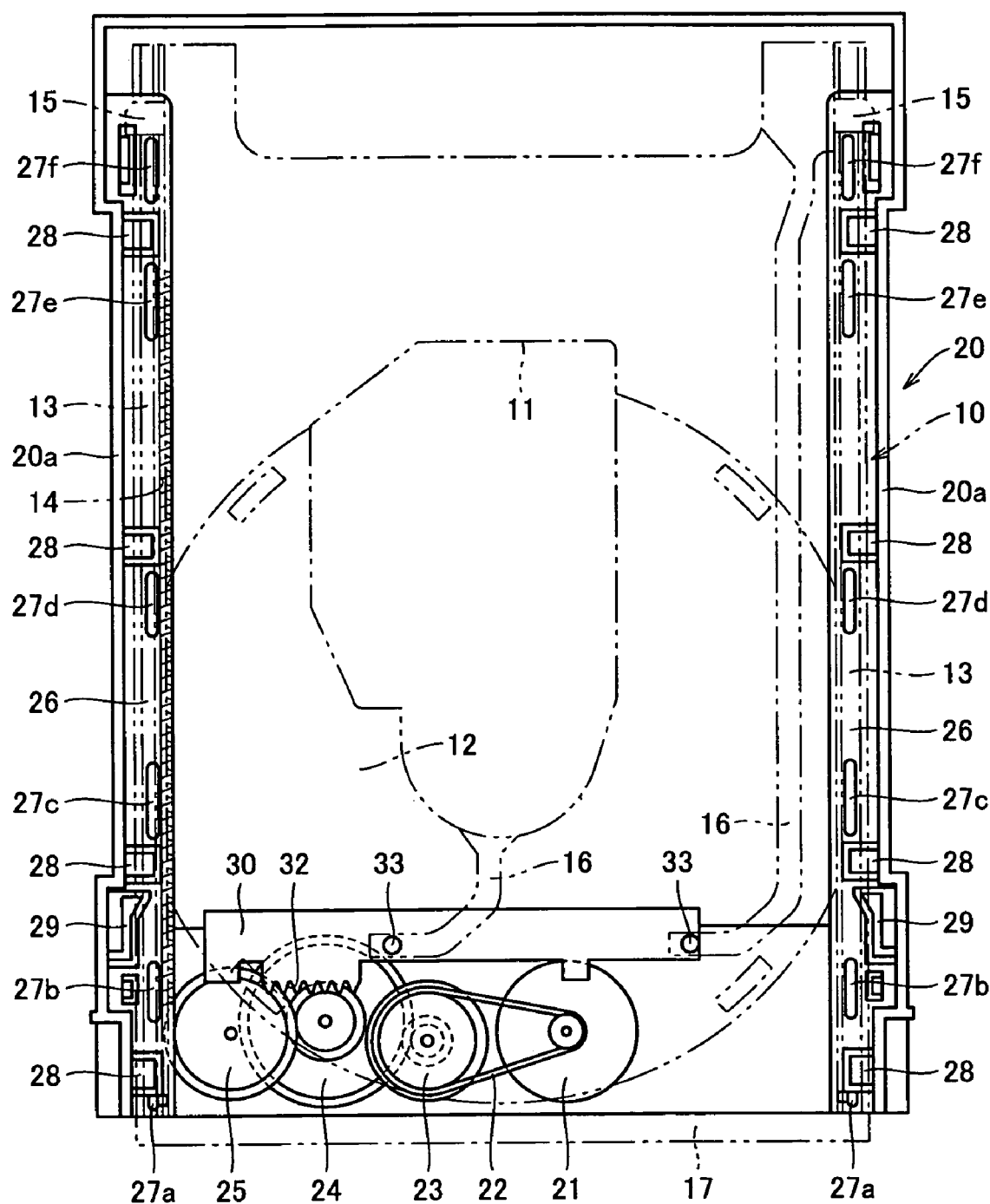
FIG. 6 is a top view showing a state in which the disc tray is assembled to the frame of the optical disc drive apparatus in the embodiment of the present invention, the disc tray being at a disc-loaded position.
Figure 7:
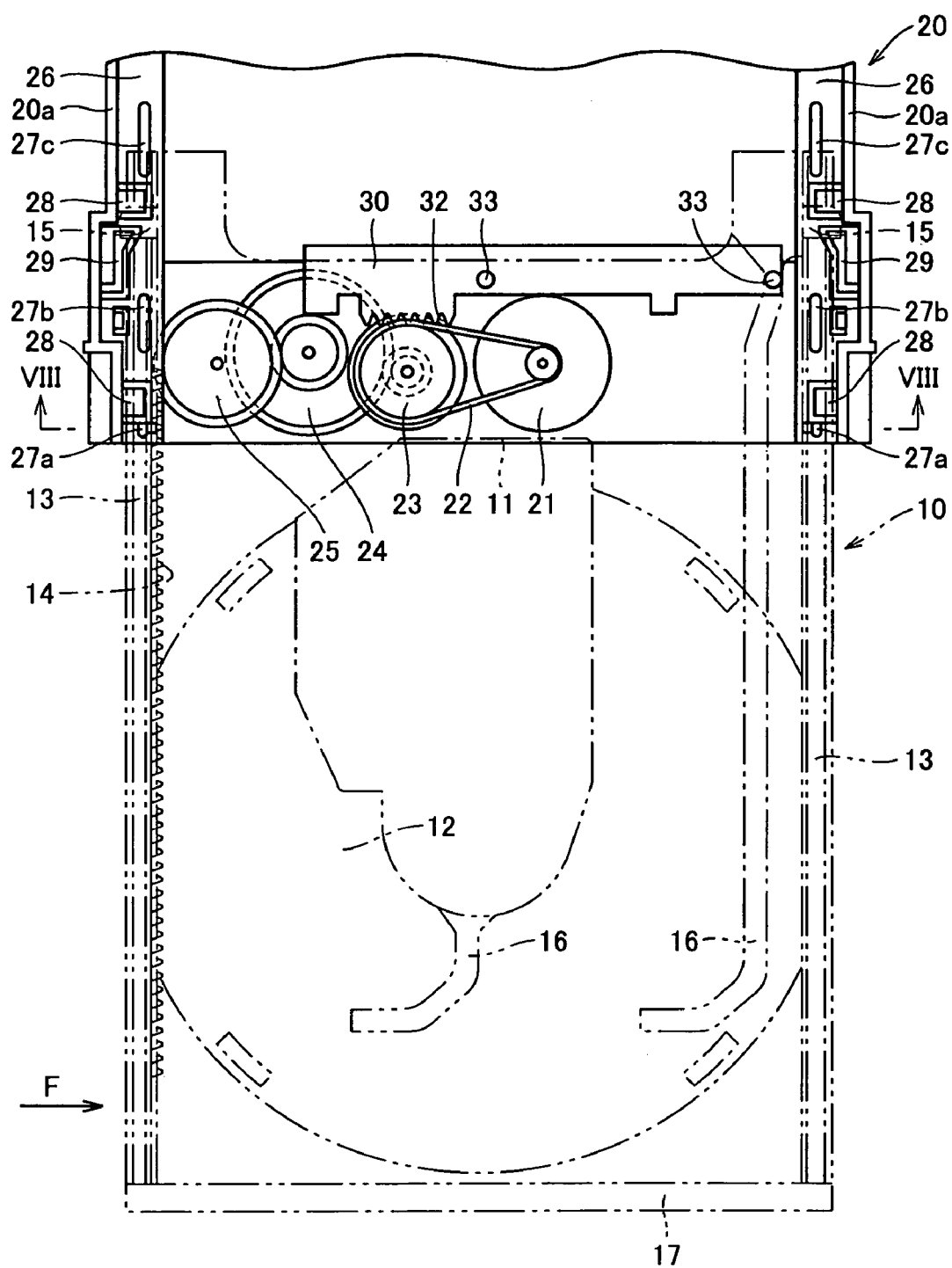
FIG. 7 is a top view showing a state in which the disc tray is assembled to the frame of the optical disc drive apparatus in the embodiment of the present invention, the disc tray being at a disc-removable position.
Figure 8:
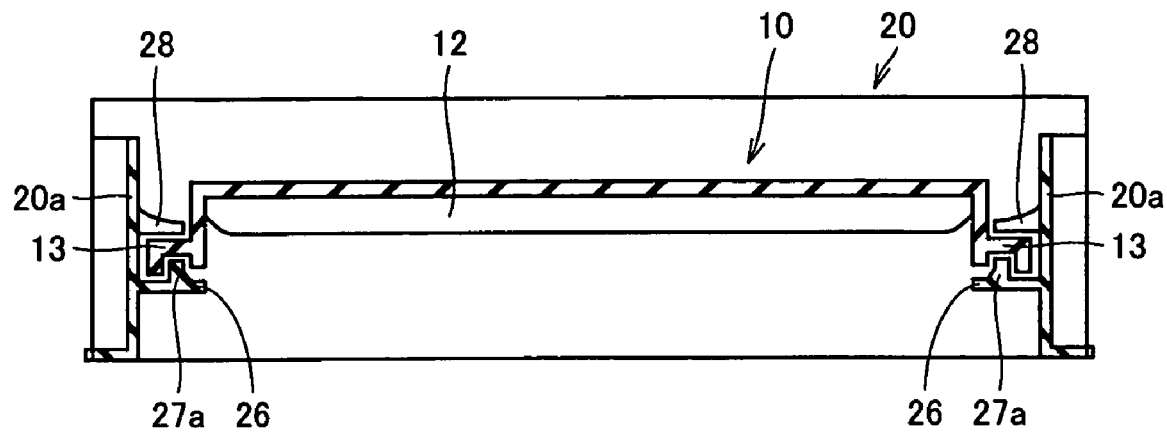
FIG. 8 is a schematic cross-sectional view along the line VIII—VIII of the optical disc drive apparatus shown in FIG. 7.

As shown in FIGS. 6 to 8, disc tray 10 is slidably assembled to frame 20. More specifically, guide protrusions 27a to 27f formed on guide rib 26 of frame 20 engage to guide groove 13 provided on the lower surface of disc tray 10, so that disc tray 10 is slidably supported by frame 20. In addition, the supported portion of disc tray 10 is clamped by guide rib 26 and guide tabs 28 provided on sidewall 20a of frame 20, so that disc tray 10 is prevented from falling from frame 20.

Disc tray 10 freely slides between the disc-removable position shown in FIG. 6 and the disc-loaded position shown in FIG. 7. Here, the disc-loaded position refers to a position at which an optical disc is held and allowed to rotate in the cabinet, whereas the disc-removable position refers to a position at which disc tray 10 partially comes out in a forward direction from the front opening of the cabinet so as to allow loading/removing of the optical disc.

Power generated by driving motor 21 is utilized for sliding disc tray 10. In order to transmit the power generated by driving motor 21, components serving as power transmission mechanisms such as timing belt 22, gear 23, pinions 24, 25, a rack 32 formed in slider 30, protrusion 33 also formed in slider 30, rack 14 provided in disc tray 10, and guide rail 16 provided on the lower surface of disc tray 10 are used. With such components, a driving force generated by driving motor 21 is transmitted to disc tray 10, thereby enabling slide of disc tray 10.

Figure 9:
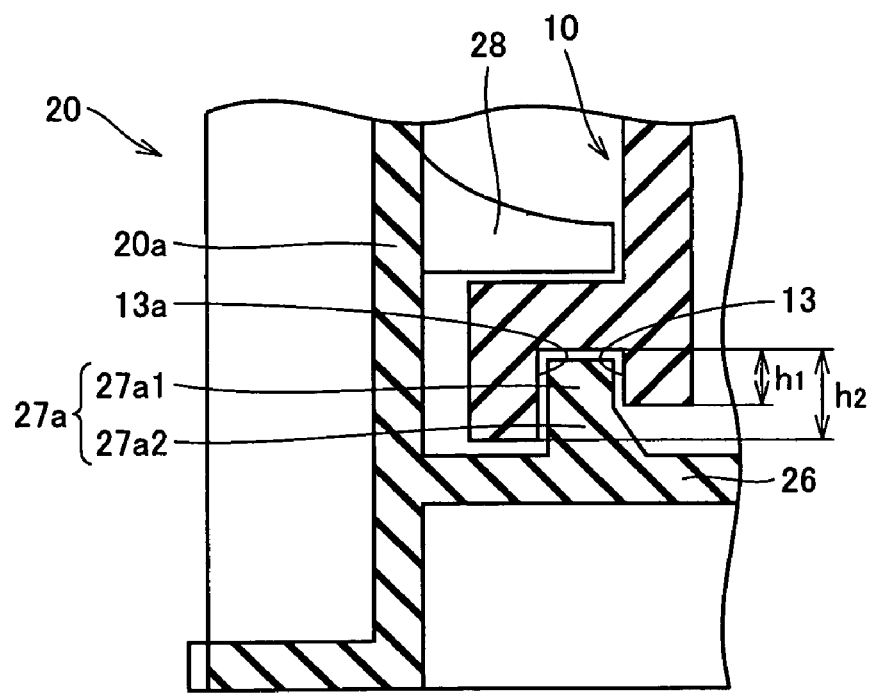
FIG. 9 is an enlarged view of an engagement portion of a guide groove to the guide protrusion in the optical disc drive apparatus in the embodiment of the present invention.
Figure 10:
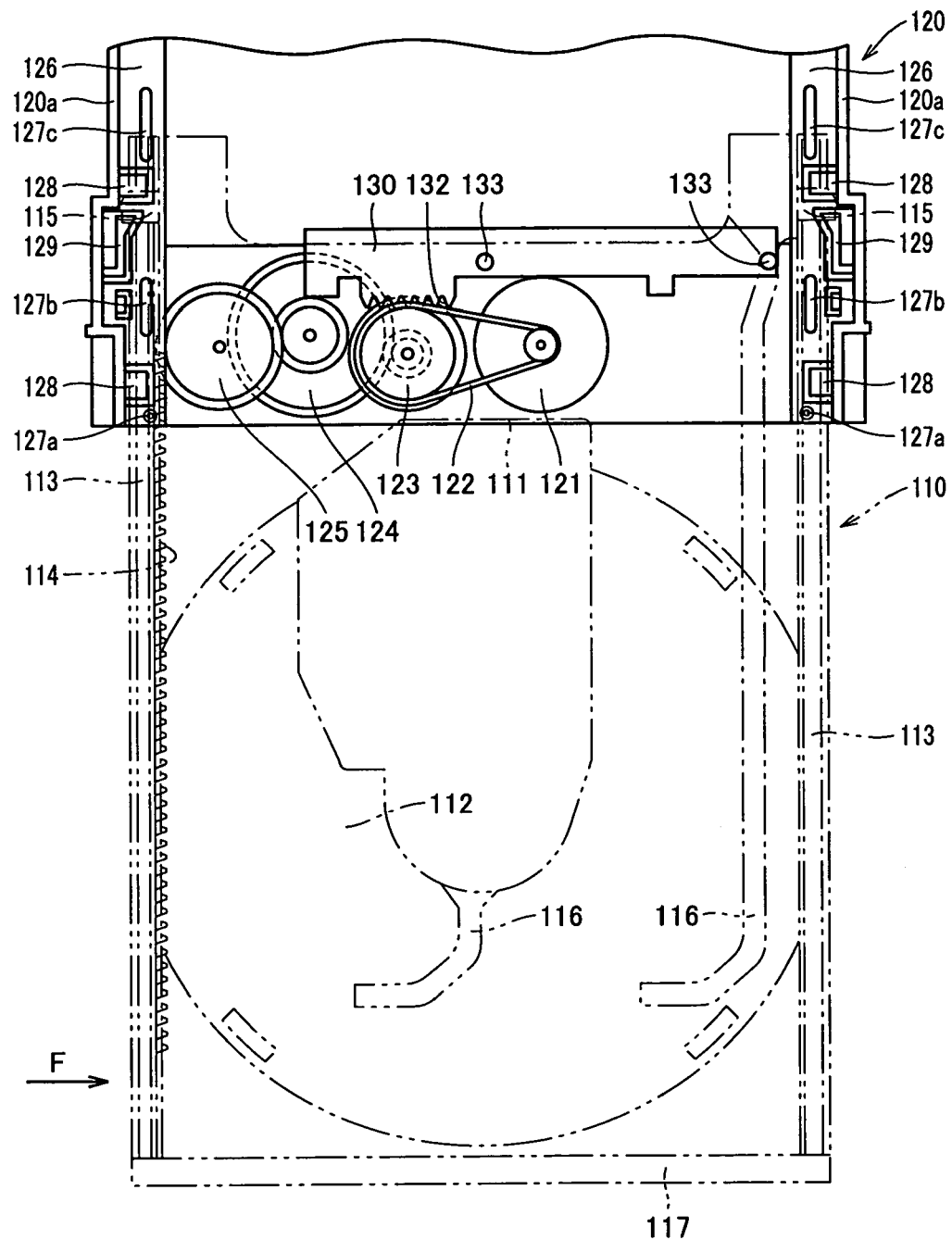
FIG. 10 is a top view showing a state in which the disc tray is assembled to the frame of a conventional optical disc drive apparatus, the disc tray being at a disc-removable position.
Figure 11:
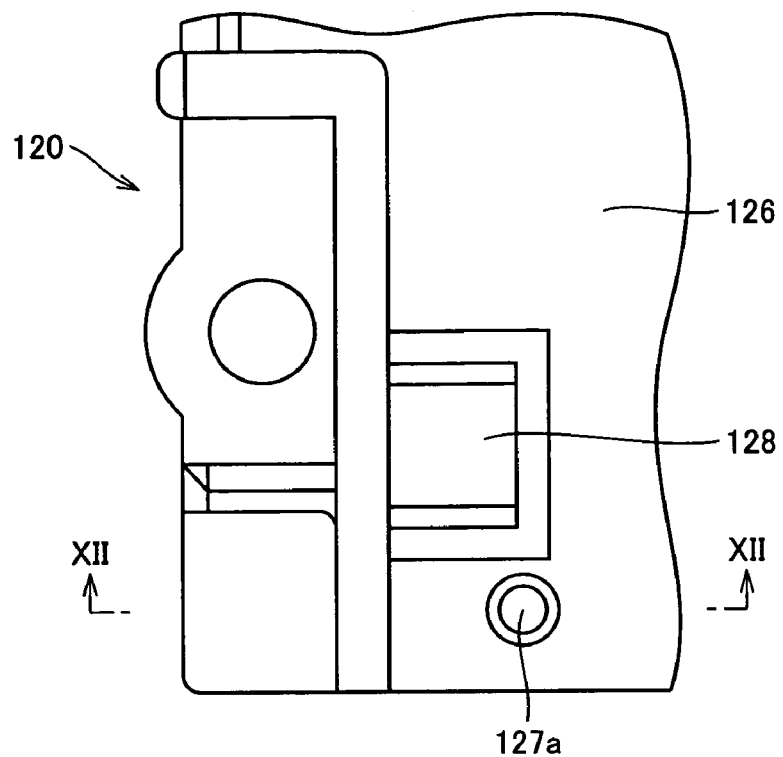
FIG. 11 is a partially enlarged view showing a shape of a guide protrusion positioned at the forefront in the conventional optical disc drive apparatus.
Figure 12:
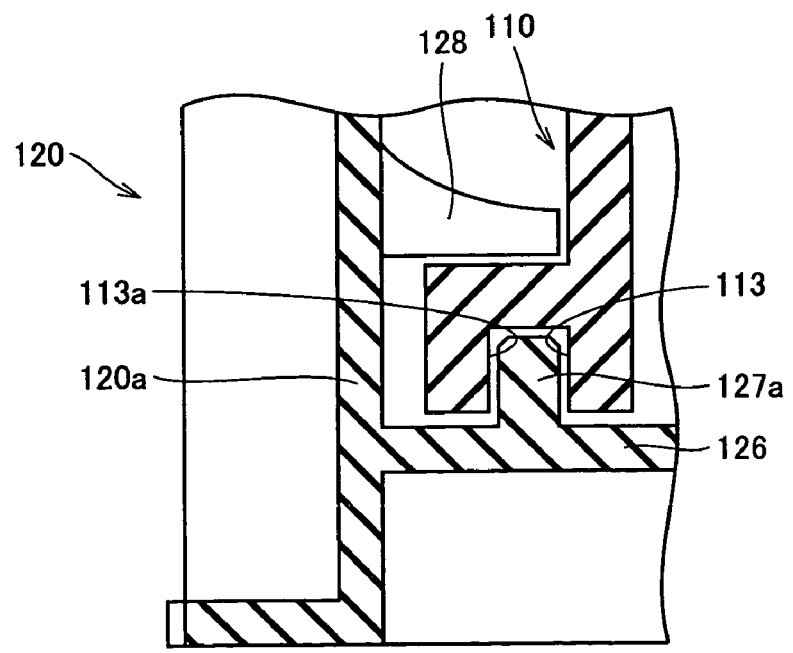
FIG. 12 is a schematic cross-sectional view along the line XII—XII of the optical disc drive apparatus shown in FIG. 11.

As shown in FIGS. 8 and 9, guide protrusion 27a positioned at the forefront of guide rib 26 is mated with wall surface 13a implementing guide groove 13 of disc tray 10 with a small clearance interposed. Here, the clearance is provided so that disc tray 10 smoothly slides on frame 20. Guide protrusion 27a positioned at the forefront of guide rib 26 is structured so as to be in surface-contact with wall surface 13a implementing guide groove 13 of disc tray 10. That is, guide protrusion 27a is structured such that it comes in surface-contact with wall surface 13a of guide groove 13 when a force F in a transversal direction as shown in FIG. 7 is applied to disc tray 10.

As described above, guide protrusion 27a positioned at the forefront has tip end portion 27a1 and root portion 27a2 having a width larger than that of tip end portion 27a1. Accordingly, guide groove 13 of disc tray 10 is structured such that, in wall surface 13a implementing guide groove 13, a height h1 of the wall surface on the center side of the optical disc drive apparatus is smaller than a height h2 of the wall surface on an outer side thereof, as shown in FIG. 9. In this manner, guide groove 13 of disc tray 10 will not come in contact with a larger width portion of root portion 27a2 of guide protrusion 27a positioned at the forefront. Consequently, smooth slide of disc tray 10 and reinforcement of guide protrusion 27a are both achieved. In addition, a contact area of the wall surface of guide groove 13 on the outer side of the optical disc drive apparatus with an outer surface of guide protrusion 27a is larger than a contact area of the wall surface of guide groove 13 on the center side of the optical disc drive apparatus with an inner surface of guide protrusion 27a. Therefore, disc tray 10 is unlikely to fall from frame 20.

With the structure as described above, even if force F in the transversal direction is applied to disc tray 10 while disc tray 10 is at the disc-removable position as shown in FIG. 7, the force applied from guide groove 13 of disc tray 10 to guide protrusion 27a positioned at the forefront is distributed, whereby guide protrusion 27a is unlikely to be broken. In addition, root portion 27a2 of guide protrusion 27a has an increased width, thereby achieving a reinforcement effect of guide protrusion 27a. Therefore, breakage of guide protrusion 27a is further unlikely.

Moreover, root portion 27a2 of guide protrusion 27a positioned at the forefront has a width increasing solely on the center side of the disc drive apparatus. In this manner, in the engagement portion of guide protrusion 27a to guide groove 13, a large contact area for engagement of guide protrusion 27a to guide groove 13 is ensured in a portion where guide protrusion 27a does not have an increased width, whereas the reinforcement effect of guide protrusion 27a is obtained in a portion where guide protrusion 27a has an increased width. Accordingly, prevention of falling of disc tray 10 and prevention of breakage of guide protrusion 27a are both achieved. As described above, an optical disc drive apparatus which is unlikely to be broken and can avoid falling of disc tray 10 even if a heavy load is applied to disc tray 10 can be provided.

Though the guide protrusion positioned at the forefront and having a substantially rectangular shape has exemplarily been described in the embodiment above, the present invention is not particularly limited thereto. According to the present invention, the structure is such that the guide protrusion positioned at the forefront is in surface-contact with the guide groove of the disc tray. The shape of the guide protrusion is not particularly limited, so long as the guide protrusion and the guide groove are in surface-contact.

The present invention is applicable to a drive apparatus for an optical information recording medium of any type including CD, CD-ROM (Compact Disc-Read Only Memory), CD-R (Compact Disc-Recordable), CD-RW (Compact Disc-Rewritable), DVD, DVD-ROM (Digital Versatile Disc-Read Only Memory), and DVD-RW (Digital Versatile Disc-Rewritable).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc drive apparatus, comprising:
a box-shaped cabinet having an opening in a front face;
a frame provided in said cabinet and having a sidewall; and
a disc tray supported by said frame; wherein
said optical disc drive apparatus is structured such that said disc tray can freely slide between a disc-loaded position at which a disc recording medium is held and allowed to rotate in said cabinet and a disc-removable position at which the disc tray partially comes out in a forward direction from said opening so as to allow loading and removing of the disc recording medium, by engagement of a supporting portion provided in said sidewall of said frame to a supported portion provided at a side edge of said disc tray,
said supporting portion includes a guide rib formed protruding from an inner wall surface of said sidewall toward a center portion of the disc drive apparatus, and a plurality of guide protrusions formed protruding upward from said guide rib in a front-to-rear direction of said guide rib,
said supported portion has a guide groove slidably engaging to said plurality of guide protrusions on a lower face side of said disc tray,
a guide protrusion positioned at forefront among said plurality of guide protrusions is structured so as to come in surface-contact with a wall surface implementing said guide groove, and
a root portion of said guide protrusion has a width increasing solely toward the center portion of the disc drive apparatus with respect to its tip end portion.

2. An optical disc drive apparatus, comprising:
a box-shaped cabinet having an opening in a front face;
a frame provided in said cabinet and having a sidewall; and
a disc tray supported by said frame; wherein
said optical disc drive apparatus is structured such that said disc tray can freely slide between a disc-loaded position at which a disc recording medium is held and allowed to rotate in said cabinet and a disc-removable position at which the disc tray partially comes out in a forward direction from said opening so as to allow loading and removing of the disc recording medium, by engagement of a supporting portion provided in said sidewall of said frame to a supported portion provided at a side edge of said disc tray,
said supporting portion includes a guide rib formed protruding from an inner wall surface of said sidewall toward a center portion of the disc drive apparatus, and a plurality of guide protrusions formed protruding upward from said guide rib in a front-to-rear direction of said guide rib,
said supported portion has a guide groove slidably engaging to said plurality of guide protrusions on a lower face side of said disc tray, and
a guide protrusion positioned at forefront among said plurality of guide protrusions is structured so as to come in surface-contact with a wall surface implementing said guide groove.

3. The optical disc drive apparatus according to claim 2, wherein
said guide protrusion positioned at the forefront has a width larger in its root portion than in its tip end portion.

* * * * *